J. S. CUSTER & H. M. P. MURPHY.
TRIPLE VALVE DEVICE.
APPLICATION FILED JULY 22, 1907.
988,629.
Patented Apr. 4, 1911.
2 SHEETS—SHEET 1.
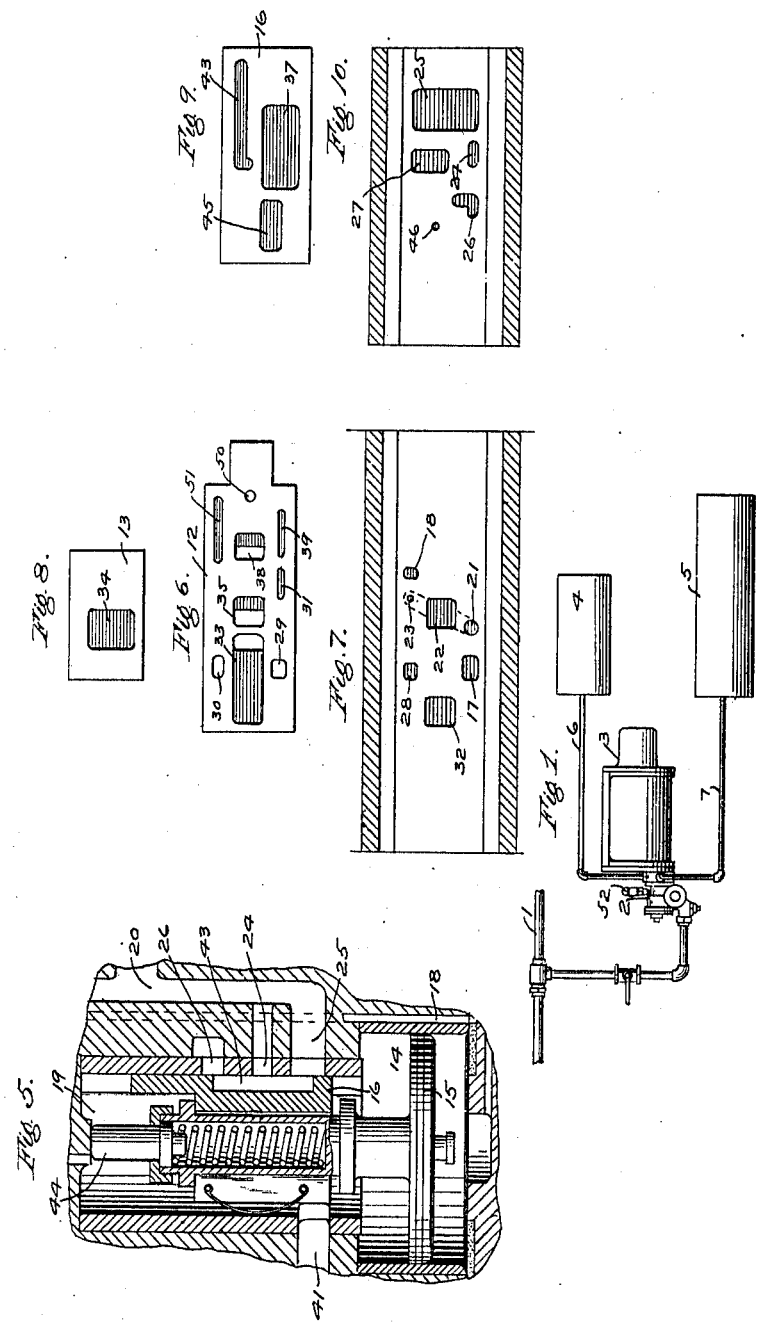
WITNESSES
Wm. M. Cady
Edith B. MacDonald
INVENTORS
Howard M. P. Murphy
John S. Custer
by E. H. Wright, Att'y.

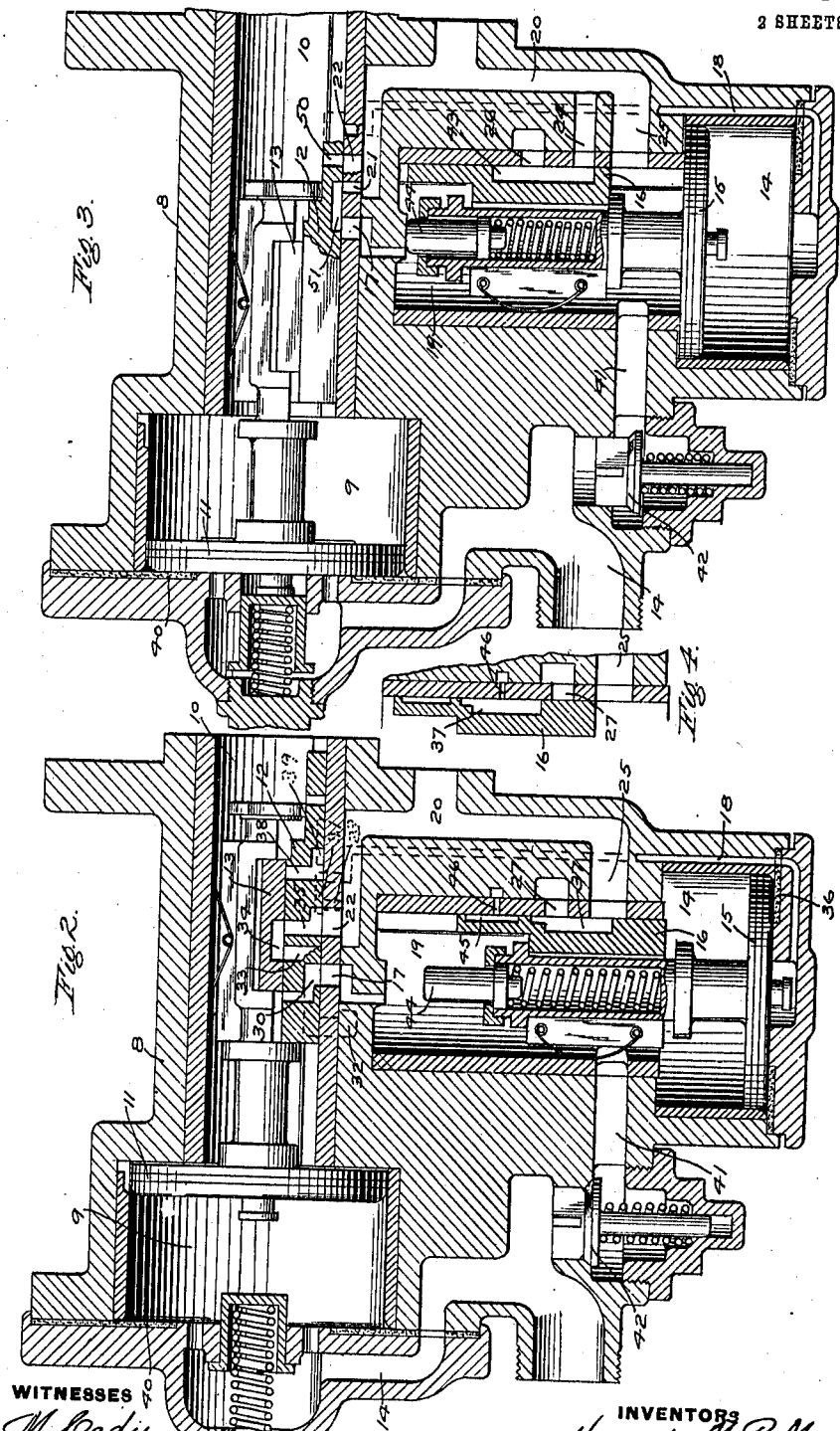

UNITED STATES PATENT OFFICE.

JOHN S. CUSTER AND HOWARD M. P. MURPHY, OF PITTSBURG, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

TRIPLE-VALVE DEVICE.

988,629.  Specification of Letters Patent.  Patented Apr. 4, 1911.

Application filed July 22, 1907. Serial No. 385,012.

*To all whom it may concern:*

Be it known that we, JOHN S. CUSTER and HOWARD M. P. MURPHY, citizens of the United States, residing at Pittsburg, in the county of Allegheny and State of Pennsylvania, have invented a certain new and useful Improvement in Triple-Valve Devices, of which the following is a specification.

This invention relates to fluid pressure brakes and particularly to triple valve devices therefor.

It has heretofore been proposed to employ the usual emergency valve mechanism, which controls the local venting of the train pipe in emergency applications of the brakes, for operating a by-pass valve, governing the admission of fluid under pressure from a supplemental reservoir or other additional source of fluid pressure to the brake cylinder in emergency applications of the brakes. It has also been proposed to employ a safety valve for limiting the brake cylinder pressure in service applications of the brakes to a predetermined degree of pressure, the triple valve being adapted to open communication from the brake cylinder to the safety valve in service applications while holding this communication closed in emergency applications.

It is the principal object of our invention to provide an improved triple valve device wherein a single valve device is employed for effecting all of the above functions, thereby simplifying the construction and providing a more compact arrangement of parts.

In the accompanying drawings, Figure 1 is a diagrammatic view of a car air brake equipment, with our improvements applied; Fig. 2 a central sectional view of a triple valve device, embodying a preferred form of our invention, showing the parts in normal full release position; Fig. 3 a similar view, showing the parts in emergency application position; Fig. 4 a sectional view of the emergency valve and its seat, with the parts in emergency application position, but showing a section thereof, in a different plane from that shown in Fig. 3; Fig. 5 a central sectional view of the emergency valve device, showing the final position of the parts after an emergency application of the brakes; Fig. 6 a face view of the main slide valve of the triple valve device, showing the location of ports and passages; Fig. 7 a plan view of the main slide valve seat, showing the arrangement of ports; Fig. 8 a face view of the auxiliary or graduating valve; Fig. 9 a face view of the emergency valve, showing the location of cavities therein, and Fig. 10 a plan view of the emergency slide valve seat, showing the arrangement of ports.

The car air brake equipment as shown in Fig. 1 comprises the usual train pipe 1, brake cylinder 3, auxiliary reservoir 4, and supplemental reservoir 5, connected by pipes 6 and 7, respectively, to a triple valve device 2, embodying our invention.

According to a preferred construction, as shown in the drawings, the triple valve device comprises a casing 8, having the usual piston chamber 9, containing the triple valve piston 11, and connected by passage 14 to the train pipe 1, and having valve chamber 10, containing the main slide valve 12 and auxiliary or graduating valve 13, and open as usual to the auxiliary reservoir. The casing 8 may also be provided with a valve chamber 19, containing an emergency valve 16, adapted to be actuated by an abutment or piston 15, operating in piston chamber 14. The valve chamber 19 is in open communication with the train pipe through passage 41, containing the non-return check valve 42. The emergency slide valve controls communication from the valve chamber 19 and train pipe to the passage 25 leading to the brake cylinder, and is also adapted to connect ports 26 and 27, leading respectively to the supplemental reservoir 5 and a safety valve 52, to the brake cylinder ports and passages 24 and 25 in certain positions.

In full release position, as shown in Fig. 2, a port 30 in the main slide valve registers with a passage 17 leading to the emergency valve chamber 19, so that when air is supplied to the train pipe, it flows past the check valve 42 to the valve chamber 19 and thence through passage 17 and port 30 to the main valve chamber 10 and the auxiliary reservoir, as well as through the usual feed groove around the triple valve piston, thus quickly charging the auxiliary reservoir to normal standard pressure. The supplemental reservoir is also charged through port 29 in the main slide valve, which registers with passage 28, leading to the supplemental reservoir. In this position the brake cylinder is connected to the atmosphere through brake cylinder passage 20, port 22, passage 35 through the main slide valve 12, cavity 34 in the graduating valve 13, and passage 33, which registers with exhaust port 32.

The emergency piston and valve are normally maintained in their extreme outer position by the train pipe pressure on the inner face of the piston, the outer face being connected at this time through a passage 18 with a brake cylinder port 23, by cavity 31 in the main slide valve, so that the same is at atmospheric pressure. In this position of the emergency valve, a cavity 37 connects the safety valve port 27 with brake cylinder port 25. When a service application of the brakes is made, the main piston and valve move to service position, the auxiliary valve 13 closing the quick recharge port 30 and the supplemental reservoir port 28 on its preliminary movement, and on further movement the main valve connects the port 38 therein, which has been uncovered by the auxiliary valve 13, with brake cylinder port 22, so that fluid from the auxiliary reservoir is admitted to the brake cylinder. In service position, a cavity 39 in the main slide valve connects the passage 18, leading to the outer side of the emergency piston 15, with the brake cylinder port 23, so that said piston remains in its outer position, being still subject to train pipe pressure on its inner side, and the safety valve 52 is therefore connected with the brake cylinder, to limit the pressure therein to the desired degree. Successive increases in brake cylinder pressure may be made in the usual way by gradual reductions in train pipe pressure, and the brakes may be released by increasing the train pipe pressure to move the piston and main and graduating valves to release position, in which the brake cylinder is connected to the exhaust and the auxiliary reservoir is quickly recharged through the recharging port 30 as before described.

To cause an emergency application of the brakes, the train pipe pressure is suddenly reduced, and the triple valve piston is moved thereby to its extreme outer position, the piston seating on the emergency gasket 40, in the usual manner. In the emergency position, as shown in Fig. 3, a port 50 in the main slide valve 12 connects the valve chamber 10 and the auxiliary reservoir with brake cylinder port 22, so that fluid from the auxiliary reservoir flows to the brake cylinder. A cavity 51 in said valve also connects the brake cylinder port 21 with port 17 leading to the emergency valve chamber 19. The passage 18, leading to the outer face of the emergency piston 15, is also uncovered by the main slide valve, so that fluid at auxiliary reservoir pressure acting on the outer face of the piston 15 shifts the same and the emergency valve to their inner position, as shown in Fig. 3, uncovering the large brake cylinder port 25, to the emergency valve chamber, so that fluid from the train pipe is rapidly vented through the check valve 42 and valve chamber 19 to the brake cylinder, to effect the usual local reduction in train pipe pressure. In this position, the emergency valve also closes the safety valve port 27, and connects the supplemental reservoir port 26, through cavity 43, with brake cylinder port 24, so that fluid from the supplemental reservoir flows to the brake cylinder to augment the pressure therein.

In order to close the communication between the train pipe and the large brake cylinder port 25, upon equalization of pressures, when an emergency application of the brakes is made, so that the brakes may be thereafter readily released, a yielding resistance spring device 44 may be provided in the piston stem of the emergency valve device, which is adapted upon substantial equalization of fluid pressures on the opposing faces of the emergency piston 15 to return said piston and the emergency valve 16 to a position in which the valve closes said brake cylinder port 25, as shown in Fig. 5. Thereafter, upon increasing the train pipe pressure to release the brakes, the fluid from the train pipe flows through the passage 41 to the valve chamber 19 and the emergency piston 15 and valve 16 are returned thereby to normal release position, the main valve and piston also return to full release position, in the usual manner, and the auxiliary reservoir and supplemental reservoir are again recharged as before described.

In order to more positively maintain the emergency valve in its various positions, we preferably provide means adapted to increase the resistance of said valve to movement at the desired points, such as an exhaust port 46 adapted in normal release position to register with a cavity 45 in said emergency valve, whereby an additional pressure of the valve on its seat is obtained, tending to resist its movement. In the emergency position of the valve 16, the cavity 37 registers with the exhaust port 46, as shown in Fig. 4, which tends to maintain the valve in emergency position in the same way.

It will now be apparent that we have provided a very simple construction, of few parts, wherein a single valve device controls the train pipe vent port and also the supplemental reservoir and the safety valve communication with the brake cylinder.

Having now described our invention, what we claim as new and desire to secure by Letters Patent is:—

1. In a fluid pressure brake, the combination with a train pipe, triple valve, brake cylinder, auxiliary reservoir, supplemental reservoir and a safety valve for limiting the brake cylinder pressure in service applications of the brakes, of a valve device for controlling a train pipe vent port, admission of fluid from said supplemental reservoir to the brake cylinder and communication from the brake cylinder through said safety valve.

2. In a fluid pressure brake, the combination with a train pipe, triple valve, brake cylinder, auxiliary reservoir, supplemental reservoir and a safety valve for limiting the brake cylinder pressure in service applications of the brakes, of a valve normally connecting the brake cylinder with said safety valve, and an actuating piston therefor, adapted, upon a sudden reduction in train pipe pressure, to shift said valve and close said safety valve connection, open a train pipe vent port and connect said supplemental reservoir with the brake cylinder.

3. In a fluid pressure brake, the combination with a train pipe, brake cylinder, auxiliary reservoir, supplemental reservoir and a safety valve for limiting the brake cylinder pressure in service applications of the brakes, of a triple valve device comprising a main valve and actuating piston therefor, and an emergency valve device normally subject on one side to fluid pressure and connecting the brake cylinder with said safety valve, said main valve being operated upon a sudden reduction in train pipe pressure, to vent the fluid under pressure from said one side of the emergency valve device and supply fluid under pressure to the opposite side and thereby shift said valve device to open a train pipe vent port and connect said supplemental reservoir with the brake cylinder.

4. In a fluid pressure brake, the combination with a train pipe, brake cylinder, auxiliary reservoir, supplemental reservoir and a safety valve for limiting the brake cylinder pressure in service applications of the brakes, of a triple valve device comprising a main valve and actuating piston therefor, and an emergency valve device normally subject on one side to fluid pressure and connecting the brake cylinder with said safety valve, said main valve being operated upon a sudden reduction in train pipe pressure, to vent the fluid under pressure from said one side of the emergency valve device and supply fluid under pressure to the opposite side and thereby shift said valve device to open a train pipe vent port and connect said supplemental reservoir with the brake cylinder, and a resistance spring device for returning said emergency valve device to close said train pipe vent port upon equalization of fluid pressures thereon.

5. In a fluid pressure brake, the combination with a train pipe, brake cylinder, auxiliary reservoir, supplemental reservoir and a safety valve for limiting the brake cylinder pressure in service applications of the brakes, of a triple valve device comprising a main valve and actuating piston therefor, and an emergency valve device normally subject on one side to fluid pressure and connecting the brake cylinder with said safety valve, said main valve being operated upon a sudden reduction in train pipe pressure, to vent the fluid under pressure from said one side of the emergency valve device and supply fluid under pressure to the opposite side and thereby shift said valve device to open a train pipe vent port and connect said supplemental reservoir with the brake cylinder, and a resistance spring device for returning said emergency valve to close said train pipe vent port upon equalization of fluid pressure thereon, said valve device being then shifted, upon an increase in train pipe pressure, to the normal position, opening communication between the brake cylinder and said safety valve.

6. In a fluid pressure brake, the combination with a train pipe, triple valve device and brake cylinder, of a supplemental reservoir and a valve device comprising a piston and a valve having ports adapted in an emergency application of the brakes to connect the train pipe and the supplemental reservoir with the brake cylinder.

7. In a fluid pressure brake, the combination with a train pipe, brake cylinder, auxiliary reservoir, supplemental reservoir, and a safety valve for limiting the brake cylinder pressure in service applications, of a valve device operating upon a sudden reduction in train pipe pressure for opening communication from the train pipe and the supplemental reservoir to the brake cylinder and for closing communication from the brake cylinder to the safety valve, and a yielding resistance means for moving said valve device to close the train pipe vent upon equalization of the pressures into the brake cylinder.

In testimony whereof we have hereunto set our hands.

JOHN S. CUSTER.
HOWARD M. P. MURPHY.

Witnesses:
R. F. EMERY,
EDITH B. MACDONALD.

Copies of this patent may be obtained for five cents each, by addressing the "Commissioner of Patents, Washington, D. C."